United States Patent [19]

Sasaki et al.

[11] Patent Number: 5,663,228
[45] Date of Patent: *Sep. 2, 1997

[54] PRESSURE-SENSITIVE ADHESIVES BASED ON PREFERENTIALLY TACKIFIED IMMISCIBLE ELASTOMERS

[75] Inventors: Yukihiko Sasaki, Claremont; Jesse Ercillo, Covina, both of Calif.

[73] Assignee: Avery Dennison Corporation, Pasadena, Calif.

[*] Notice: The term of this patent shall not extend beyond the expiration date of Pat. No. 5,290,842.

[21] Appl. No.: 203,349

[22] Filed: Feb. 28, 1994

Related U.S. Application Data

[63] Continuation of Ser. No. 921,444, Jul. 27, 1992, Pat. No. 5,290,842, which is a continuation of Ser. No. 755,585, Sep. 3, 1991, abandoned, which is a continuation of Ser. No. 493,363, Mar. 14, 1990, abandoned.

[51] Int. Cl.⁶ .................................................. C09J 11/08
[52] U.S. Cl. ........................... 524/271; 524/481; 524/485; 524/505
[58] Field of Search .................................. 524/271, 481, 524/485, 505

[56] References Cited

U.S. PATENT DOCUMENTS

| | | |
|---|---|---|
| 3,577,398 | 5/1971 | Pace et al. . |
| 3,692,756 | 9/1972 | St. Cyr . |
| 3,872,064 | 3/1975 | Pace et al. . |
| 3,932,328 | 1/1976 | Korpman . |
| 4,080,348 | 3/1978 | Korpman . |
| 4,104,327 | 8/1978 | Inoue et al. ............................ 526/308 |
| 4,125,665 | 11/1978 | Bemmels et al. . |
| 4,288,480 | 9/1981 | Grzywinski et al. ...................... 428/40 |
| 4,325,770 | 4/1982 | Korpman ................................ 156/230 |
| 5,290,842 | 3/1994 | Sasaki et al. ............................ 524/271 |

OTHER PUBLICATIONS

*Hawley's Condensed Chemical Dictionary*, Eleventh Ed., Van Nostrand Reinhold, New York, pp. 932, 938 (1986).
*Handbook of Adhesives*, Third Ed., Van Nostrand Reinhold, New York, pp. 641–663 (1989).
Wingtack™ 86 Tech Facts, "Hot Melt and Pressure Sensitive Adhesive Properties," by Good Year Chemical, Form 588500–Mar. 1993, 1 page (1993).

Wingtack™ 86 Tech Facts, "Description and Physical Properties," by Good Year Chemical, Form 588600–Mar. 1993, 2 pages (1993).

Wingtack™ Extra Tech Facts, by Good Year Chemical, Form 588400–Mar. 1993, 2 pages (1993).

Wingtack™ Plus Tech Facts by Good Year Chemical, Form 588300–Mar. 1993, 2 pages (1993).

Wingtack™ 10 Tech Facts by Good Year Chemical, Form 588800–Mar. 1993, 2 pages (1993).

Wingtack™95 Tech Facts by Good Year Chemical, Form 588900–Mar. 1993, 2 pages (1995).

Wingtack™ Tech Facts, "Solubility and Compatibility of Wingtack Resins," by Good Year Chemical, Form 589000–Mar. 1993 (1993).

Rubber World Magazine's Blue Book 1987 edition, "materials, compounding ingredients, and machinery for rubber," by Lippincott & Peto Inc. –pp. 440–444, pp. 451–452, pp. 471–474 (1987).

Handbook of Pressure–Sensitive Adhesive Technology (Copyright 1982 by Van Nostrand Reinhold Company Inc.), the face page, Table of Contents pages, and pages 220–223 and 229–234.

Hercules "Selection Guide for Hercules Hydrocarbon Resins," (31 pages) (no date).

Adhesives and Sealants Industry Sector, "Escorez® Tackifiers for Adhesives & Sealants" by Exxon Chemical, (pages 1–3) (no date).

*Primary Examiner*—Romulo H. Delmendo
*Attorney, Agent, or Firm*—Christie, Parker & Hale, LLP

[57] ABSTRACT

A pressure sensitive adhesive of a mutually immiscible first elastomer (styrene-butadiene block copolymer) exhibiting a first glass transition temperature and a second elastomer (e.g., a styrene-isoprene-styrene block copolymer) exhibiting a second glass transition temperature greater than the first is tackified by a tackifying system comprising tackifier preferentially miscible with the second elastomer to provide a dynamic mechanical spectrum plot of tangent delta versus temperature in °C. showing two separate and distinct glass transition temperature peaks. The mixture exhibits excellent processability and ambient and low temperature adhesive properties.

45 Claims, 8 Drawing Sheets

PRESSURE-SENSITIVE ADHESIVES BASED ON PREFERENTIALLY TACKIFIED IMMISCIBLE ELASTOMERS

This is a continuation of application Ser. No. 07/921,444, filed Jul. 27, 1992, now U.S. Pat. No. 5,290,842, which is a continuation of Ser. No. 07/755,585 filed Sep. 3, 1991, now abandoned, which is a continuation of Ser. No. 07/493,363 filed Mar. 14, 1990, now abandoned.

FIELD OF THE INVENTION

The present invention is directed to elastomer or rubber based pressure-sensitive adhesive compositions used in label and tape manufacture.

BACKGROUND OF THE INVENTION

During label manufacture, a laminate of a face stock, pressure-sensitive adhesive layer and a release liner is passed through apparatus which convert the laminate to yield commercially useful labels and label stock. The processes involved in the converting operation include printing, die cutting and matrix stripping to leave labels on a release liner, butt cutting of labels to the release liner, marginal hole punching, perforating, fan folding, guillotining and the like.

Die and butt cutting involve cutting of the laminate to the face of the release liner. Other procedures involve cutting clean through the label laminate and include hole punching, perforating and guillotining.

The cost of converting a laminate into a finished product is a function of the speed at which the various processing operations occur. While the nature of all layers of the laminate can impact cost of convertibility, the adhesive layer has been the greatest limiting factor in ease and cost of convertibility. This is in consequence of its viscoelastic nature which hampers precise and clean penetration of a die in die cutting operations and promotes adherence to cutting blades and the like in cutting operations. Stringiness of the adhesive also impacts matrix stripping operations which follow die cutting operations.

Achieving good convertibility does not, by necessity, coincide with achieving excellent adhesive performance. Adhesives must be formulated to fit needs and important properties include peel adhesion, tack, shear, viscosity at various temperatures and the like. Good general purpose adhesives may exhibit poor convertibility simply because the adhesive is difficult to cleanly cut. Such an adhesive may stick to a die or blade. In label manufacture, die cutting and matrix stripping operations by necessity occur at a variety of speeds in the range of 0 to 300 meters per minute. Within the range, an adhesive may provide regions where a matrix will break despite the fact that successful matrix stripping can occur at speeds on either side of the region. One goal is to provide adhesive systems wherein the adhesive can be cleanly cut and the matrix stripped over the entire range of operating speeds, as shown as a cutting frequency in attached FIGS. 1 and 2.

Natural and synthetic elastomers containing polybutadiene segments and polyisoprene segments are not miscible with each other. It is known in the art, however, to mix immiscible elastomeric polymers based on polybutadiene and polyisoprene. Homopolymers are more difficult to employ than block copolymers. With block copolymers, while the midblocks are immiscible, the end blocks of polystyrene form one common domain making the mixture stable without major problems of incompatibility such as separation of phases with time.

Additives to mixtures based on polyisoprene and polybutadiene vary in their compatibility with the polybutadiene or polyisoprene portions of the elastomer. While preferentially soluble in either the polyisoprene or the polybutadiene, normally there is some degree of compatibility with both components. Of the additives, those which tend to have no impact or increase glass transition temperature are regarded in the art as tackifiers and those which tend to lower glass transition temperature as plasticizers. Additives may be preferentially soluble in the polystyrene portion and may act as a reinforcing agent.

U.S. Pat. No. 4,125,665 to Bemmels, et al. is directed to a pressure-sensitive adhesive for use as a sealing tape in applications such as closure for juice and beverage cans having a top with a preformed aperture for liquid dispensing. The pressure-sensitive adhesive layer contains a relatively high melting point tackifier resin and a relatively low molecular weight styrene block associating bonding resin. Example 2 in Table A of the '665 patent discloses a mixture of Kraton 1107, a styrene-isoprene-styrene (SIS)/styrene-isoprene (SI) block copolymer and Kraton 1102, a styrene butadiene (SB)/styrene-butadiene-styrene (SBS) block copolymer, both manufactured by Shell, along with Wingtack 95, a $C_5$ or $C_6$ normally solid tackifier as taught in U.S. Pat. No. 3,577,398 assigned to Goodyear Tire and Rubber Company and incorporated herein by reference, and a styrene block associating bonding resin. In the absence of the styrene block associating bonding resin, the mixture displayed, according to the patentees, poor adhesion to steel and the addition of the styrene associating material was necessary to overcome the deficiency.

U.S. Pat. No. 4,080,348 to Korpman discloses in Example 2 of Table A an SI block copolymer, an SBS block copolymer and, as a tackifier, Wingtack 76. The weight ratio of the butadiene containing block copolymer to the isoprene containing block copolymer is 0.25:1. We have found that such mixtures only show one glass transition temperature to be present, that being the one predominantly contributed by the isoprene containing block copolymer.

Other patents of interest are U.S. Pat. No. 3,880,953 to Downey, U.S. Pat. No. 3,509,239 to Tindall, U.S. Pat. No. 4,060,503 to Feeney, et al. and U.S. Pat. No. 3,932,328 to Korpman which employs as a hot-melt adhesive mixture SIS block copolymer tackified with a blend of normally solid and normally liquid tackifiers consisting essentially of polymerized structures derived from aliphatic dienes and mono-olefins of 5 or 6 carbon atoms (Wingtack 95 and Wingtack 10 manufactured by Goodyear); and U.S. Pat. No. 4,411,954 to Butch III, et al.

SUMMARY OF THE INVENTION

According to the present invention, there is provided an elastomer or rubber-based pressure-sensitive adhesive composition which exhibits excellent convertibility, i.e., the ability to achieve cutting of the adhesive in processing operations involving cuttings through a face stock and adhesive to at least the release liner of the laminate, while at the same time providing excellent adhesive properties at both ambient and reduced temperatures.

These results can be obtained by combining in admixture two or more immiscible elastomers which when combined in proportion provide at least two glass transition temperatures and by the addition of one or more additives which serve to tackify the mixture and result in an increase in the difference between the two glass transition temperatures as a consequence of preferential miscibility of the tackifier in the additive elastomer having the highest glass transition temperature and an amplification of tangent delta of the elastomer having the higher glass transition temperatures. Although explained in terms of diene elastomers, the invention is contemplated to be applicable to immiscible tackifiable polymers including, but not limited to, acrylic ester based polymers and the like.

In a preferred aspect, the invention is based on an admixture of a first natural or synthetic elastomer providing a first polymerized diene, preferably polybutadiene, and exhibiting a first glass transition temperature and a second natural or synthetic elastomer providing a second polymerized diene component, preferably polyisoprene, and having a second glass transition temperature higher than the first. The elastomers are mixed in proportion to exhibit a dynamic mechanical spectrum (DMS), i.e., a plot of a tangent delta (the ratio of G" to G' as defined herein) against temperature, with at least two, as opposed to one, distinct peaks corresponding to glass transition temperatures of the first polymerized diene (polybutadiene) and second polymerized diene (polyisoprene) components of the immiscible blend. A tackifying system comprising at least one solid tackifier is added to increase the glass transition temperature of at least the second peak in order to increase the temperature differential between the peaks, while increasing the amplitude (tangent delta) of the second (polyisoprene) peak. Shifting at least the second peak toward ambient temperature improves ambient temperature pressure-sensitive adhesive performance. The maintenance of the first peak assures flow temperature pressure-sensitive adhesive performance. Low values of tangent delta give good processability and cuttability.

The immiscible rubbers are provided in proportion of the polybutadiene containing elastomer to the polyisoprene containing elastomer from about 0.5:1 to about 5:1 and comprise from about 20% to about 50% by weight of the total weight of the mixture of elastomers and tackifying additive.

The tackifying system is preferentially soluble in the polyisoprene component and comprises normally solid tackifying resin, preferably based on polymerized structures derived from aliphatic dienes and mono-olefins containing 5 or 6 carbon atoms, preferably with at least 40% of the structures derived from piperylene or from piperylene and isoprene, aromatic resins which are hydrogenated to the degree that substantially all of the benzene rings are converted to cyclohexane rings, and hydrogenated polycyclic resins such as hydrogenated dicyclopentadiene resins. The additive system preferably includes a normally liquid tackifying resin which is preferentially soluble in the polyisoprene component. Other constituents of the tackifying system include rosin, rosin ester and polyterpenes which are at least partially compatible with the polyisoprene component, and plasticizing oils. The additives do not, however, limit the function of the tackifiers, namely, increasing the glass transition temperature differential between the peaks.

Presently preferred compositions are those in which the ratio of the polybutadiene-based elastomer to the polyisoprene-based elastomer is about 1.3:1 and present in about 15% to about 30% by weight based on the total composition, the balance of the composition, except for inhibitors, antioxidants and other modifiers, being of the tackifying additive.

BRIEF DESCRIPTION OF THE DRAWINGS

(FIG. 9), 5° C. (FIG. 10) and −5° C. (FIG. 11);

The plots of FIGS. 9–14 are based on a mixture of elastomers (E) in a proportion of 1.3 parts styrene-butadiene block copolymer to 1 part styrene-isoprene-styrene/styrene-isoprene block copolymer, a liquid tackifying additive (LT) known as Wingtack 10, and a normally solid tackifying additive (ST) known as Escorez 1310 LC.

DETAILED DESCRIPTION

Figure 4:
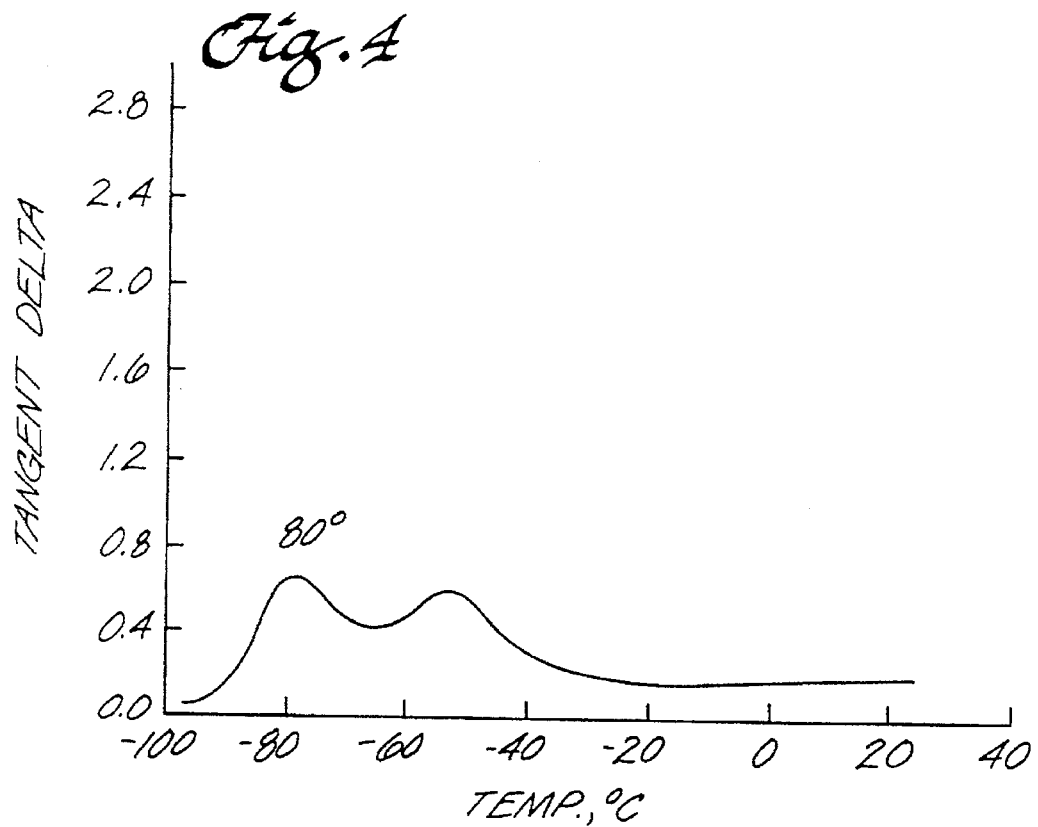
FIG. 4 is a plot of tangent delta as a function of temperature for a blend of the same styrene-butadiene block copolymer and the styrene-isoprene-styrene/styrene-isoprene block copolymer, but at a weight ratio of 1.3:1. Two peaks are shown, the lower temperature peak for polybutadiene and the higher temperature peak for polyisoprene.
Figure 5:
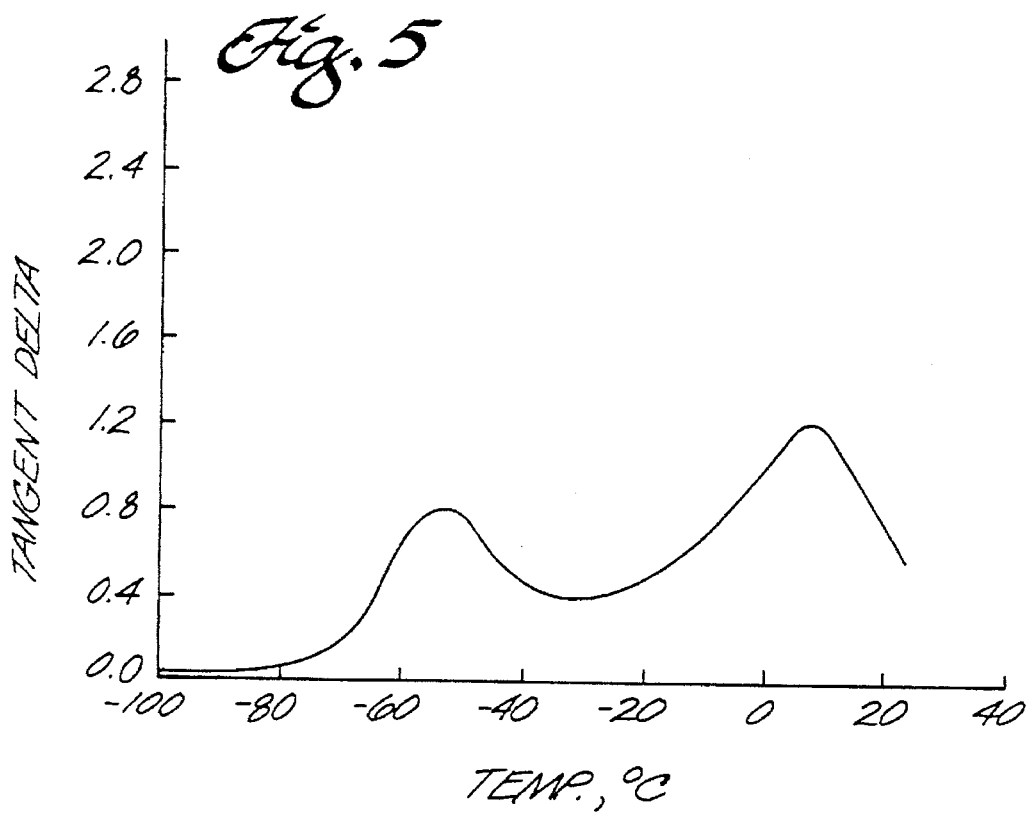
FIG. 5 is a plot of tangent delta as a function of temperature for the same blend of elastomer rubbers as FIG. 4, but tackified according to Example 14 to provide a pressure-sensitive adhesive, and illustrates the increase in the differential between the two peaks and the amplification of the peak associated with the polyisoprene component of the immiscible elastomer blend.
Figure 6:
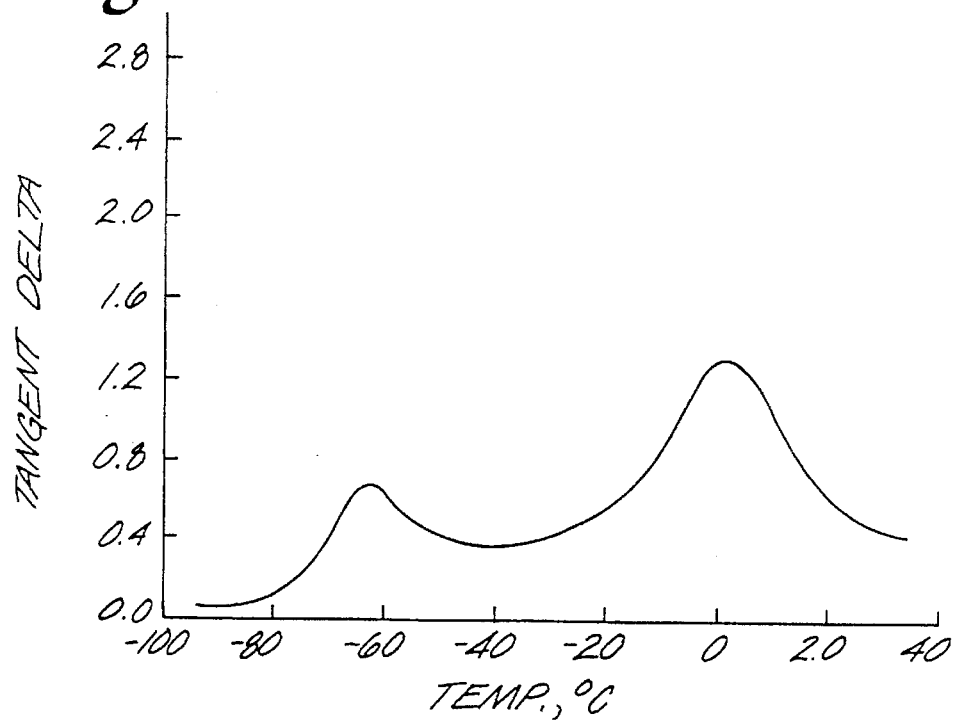
FIG. 6 is a plot of tangent delta as a function of temperature for the pressure-sensitive adhesive composition of Example 17 showing the differential in the two peaks as a consequence of addition of a tackifier.

The present invention is directed to a mixture of two immiscible natural or synthetic elastomers, one based on a first polydiene, preferably polybutadiene, exhibiting a first glass transition temperature and a value of tangent delta and the other based on a second polydiene, preferably polyisoprene, exhibiting a second glass transition temperatures higher than the first and a second value of tangent delta associated therewith. The two elastomers are combined in proportion whereby there is exhibited two distinct glass transition temperature peaks in a DMS curve, a plot of tangent delta as a function of temperature in °C. (FIG. 4). There is provided to the composition a tackifying system which comprises tackifiers preferentially soluble in the second polydiene component which cause the temperature differential between the glass transition temperature peaks in the DMS curve to increase and the amplitude of the tangent delta for the second glass transition temperature to also increase (FIGS. 5 and 6). The net result is to provide a pressure-sensitive adhesive composition exhibiting improved conversion as seen in ability to cut the adhesive and, because of tangent delta peaks at low temperature approaching ambient, respective excellent low and ambient temperature pressure-sensitive adhesive performance.

Figure 1:
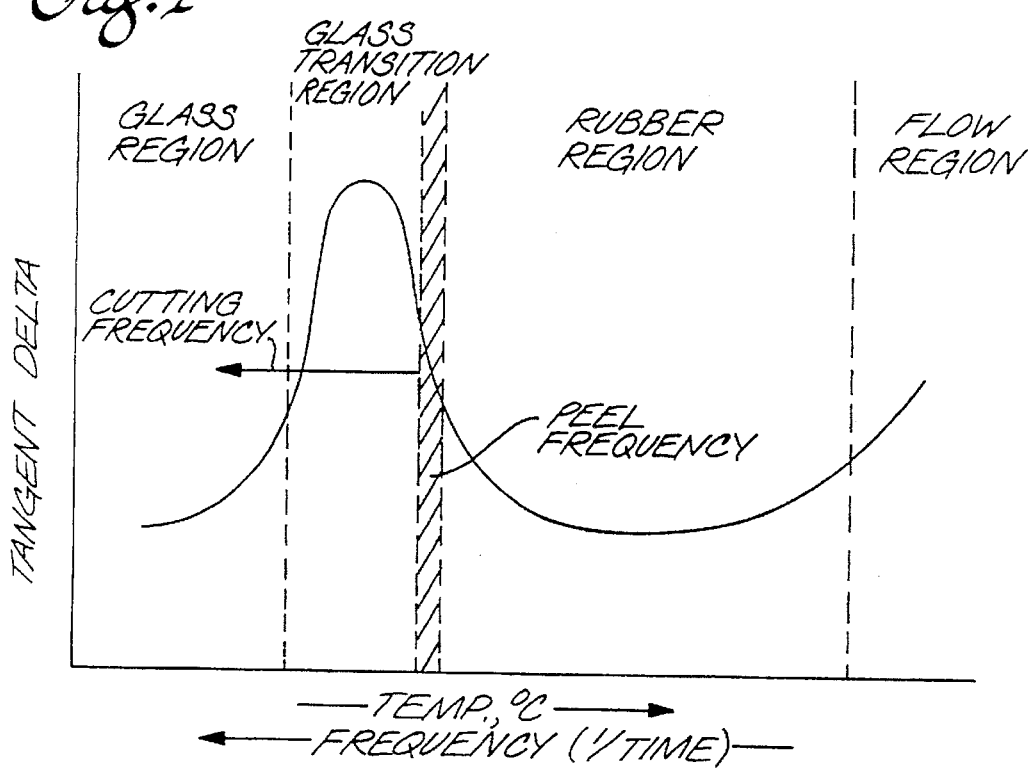
FIG. 1 is an idealized plot of tangent delta as a function of temperature and frequency for a tackified pressure-sensitive adhesive system based on an elastomer providing a single peak in the glass transition temperature region and also depicts regions of cutting and peel frequencies.

With reference to FIG. 1, in a system based on a single uncross-linked elastomer or rubber, one finds a peak in a plot of tangent delta, the ratio of loss modulus (G") to the storage modulus (G'), as a function of temperature in °C. measured at the frequency of 10 radians/second. This peak is attributed to the transition from the glassy state to the rubbery state (glass transition).

Figure 2:
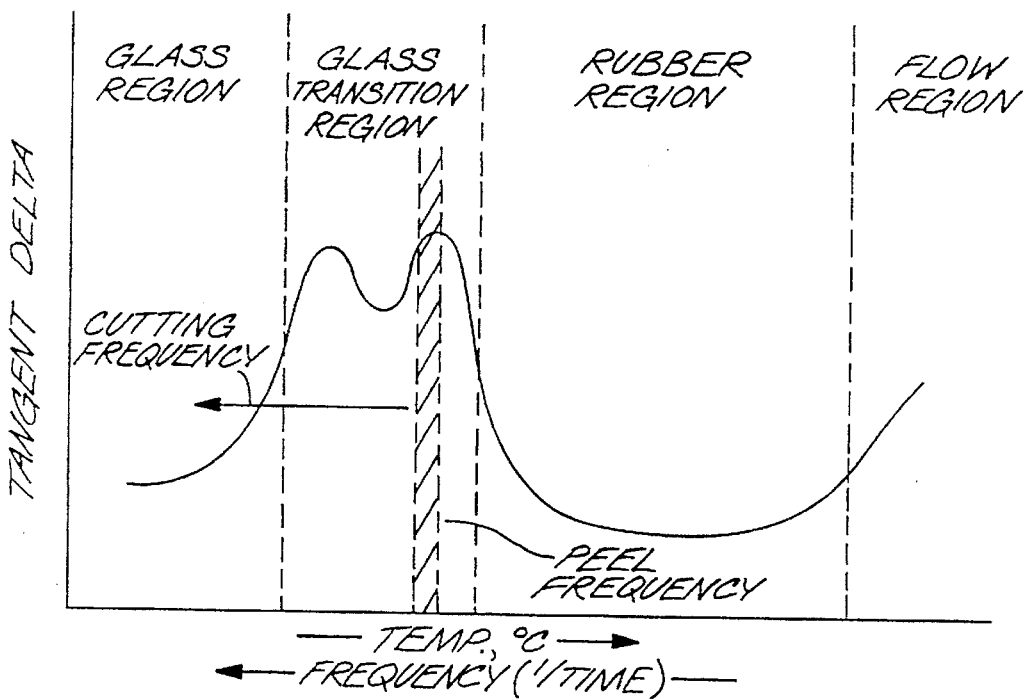
FIG. 2, as FIG. 1, is an idealized plot of tangent delta as a function of temperature and frequency but for a tackified pressure-sensitive adhesive based on a blend of immiscible elastomers displaying multiple (two) peaks in the glass transition region.

FIGS. 1 and 2 could be plotted as a function of temperature or frequency (1/time). By the time temperature superposition principle, increasing temperature is equivalent to decreasing frequency. Tangent delta is preferably as low as possible for good processability, in particular cutting, the cutting frequency region indicated in FIGS. 1 and 2, which frequency is above peel frequency in the transition between the glassy region and the rubbery region. On the other hand, for good pressure-sensitive adhesive performance (peel adhesion), tangent delta in the transition region should be high corresponding to peel frequency (10 radians/second as shown in FIG. 1).

As shown in FIG. 2, this invention is directed to modification of the transition region to obtain, as explained, the best compromise of good adhesion and good processability (cutting) by having two or more glass transition peaks in a broadened transition region.

As illustrated in FIGS. 3 to 8, by "dynamic mechanical spectrum" (DMS) there is meant a plot of tangent delta, the ratio of loss modulus (G") to storage modulus (G'), as a function of temperature as measured by placing an approximation 1-2 mm thick sample between two parallel plates of a Rheometrics instrument (Model RMS-800 manufactured and sold by Rheometrics, Inc., Piscataway, N.J.), and oscillating the plates relative to each other at 10 radians per second. Measurements are made on a continuous basis and tangent delta is computed as a function of temperature in degrees centigrade. Storage modulus (G') is a measure of elasticity and loss modulus (G") is a measure of the amount of energy lost as heat or sound and, in the case of peeling the pressure-sensitive adhesives, can be correlated to the amount of energy dissipated in peeling the viscoelastic polymeric material from a substrate.

As used herein, "glass transition temperature" is the temperature at which a polymerized segment changes from a glassy to a rubbery state. Sequences of concern have a glass transition temperature below about 50° C. With reference to FIG. 4, the glass transition temperature of polybutadiene is about −80° C. and of polyisoprene is about −54° C. A polystyrene block also has a glass transition temperature at about 80° C. and with reference to FIGS. 1 and 2 is in the flow region.

Figure 3:
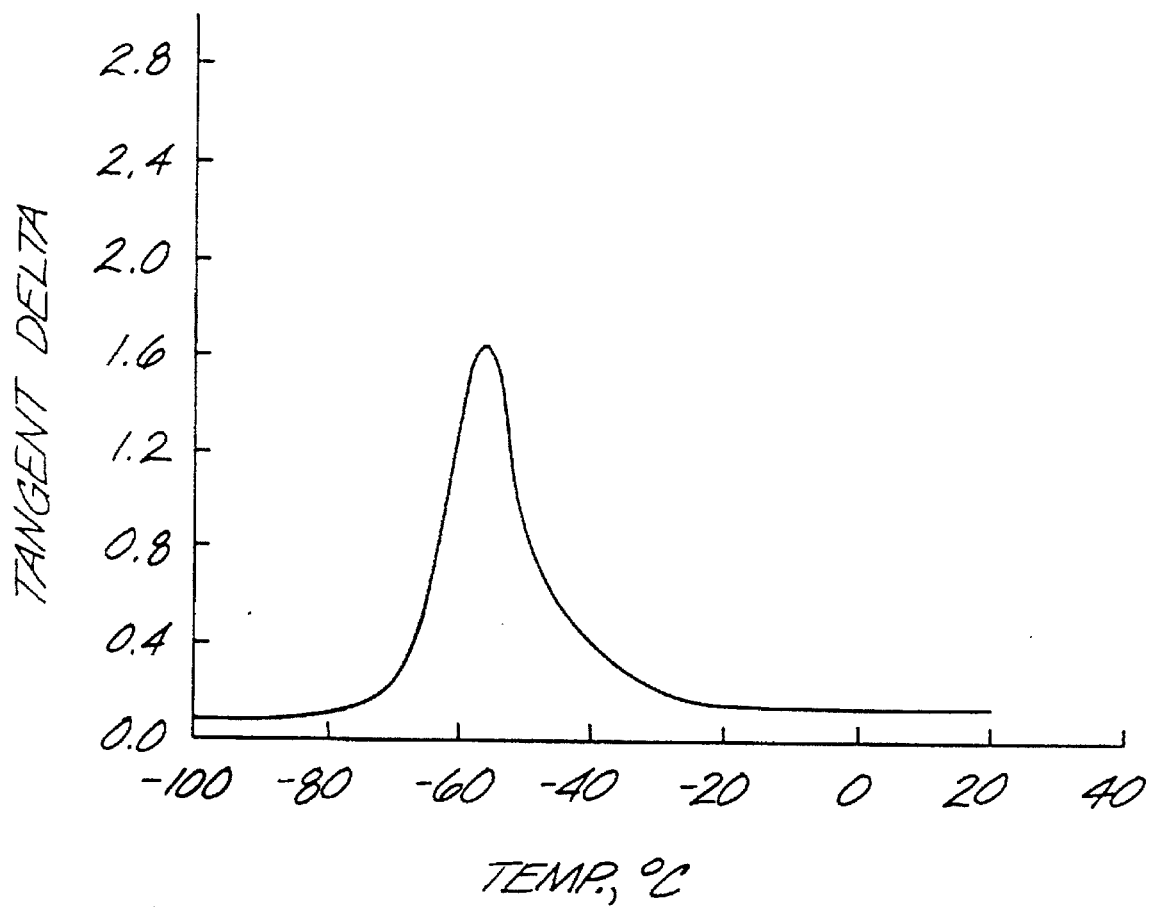
FIG. 3 is a plot of tangent delta as a function of temperature for a blend of a styrene-butadiene block copolymer and a styrene-isoprene-styrene/styrene-isoprene block copolymer at a relative weight ratio of about 0.4:1 wherein only one peak is shown and dominated by the presence of the polyisoprene component.

FIG. 3 is a plot of tangent delta as a function of temperature for a styrene-butadiene block copolymer (Solprene 1205) and a styrene-isoprene-styrene/styrene-isoprene block copolymer blend (Kraton 1112) at a weight ratio of 0.4 to 1. There is shown thereon the single peak is dominated by the polyisoprene segment. High peak tangent delta is adverse to processability.

FIG. 4 illustrates the dual peaks provided by the same mixture of elastomers, but in proportions of about 1.3 to 1 as is preferred in the instant invention. The reduction in peak tangent delta improves processability. As formulated, this mixture is not a pressure sensitive adhesive.

FIG. 5 illustrates the DMS curve for a tackified composition based on about 38% by weight of the mixture of elastomers, the DMS of which is plotted in FIG. 4, and about 62% by weight of a tackifier system based on Escorez 1310 LC (a normally solid tackifier manufactured and sold by Exxon) and Wingtack 10 (a normally liquid tackifier manufactured and sold by Goodyear). While there is an increase in the tangent delta for the second or higher temperature peak exhibiting some loss in processability, tangent deltas are still lower than the single peak of FIGS. 3, 7 and 8 exhibiting on a relative basis better processability. The polyisoprene peak of FIG. 5 has been shifted to a higher temperature (about 8° C.). This shift is due to the preferential solubility of the tackifier in the polyisoprene resulting in an increase in glass transition temperature greater than the increase in glass transition temperature of the polybutadiene peak. The shift of the polyisoprene peak towards ambient temperature establishes improved pressure-sensitive adhesive properties at ambient temperature (about 20° to 23° C.), while the distinct existence of the polybutadiene peak is indicative of providing improved low temperature pressure-sensitive adhesive properties.

Systems where the elastomeric constituents are immiscible but form a single peak (FIG. 3) are not functional for the purposes of the instant invention, except when combined with another immiscible constituent which forms a second DMS peak. Immiscible systems which form two peaks are systems where the peaks are separately represented by contributions of the polyisoprene and polybutadiene components (FIG. 4) and where, in accordance with the instant invention, the temperature differential between the peaks is increased by the addition of a tackifier (FIGS. 5 and 6).

Figure 7:
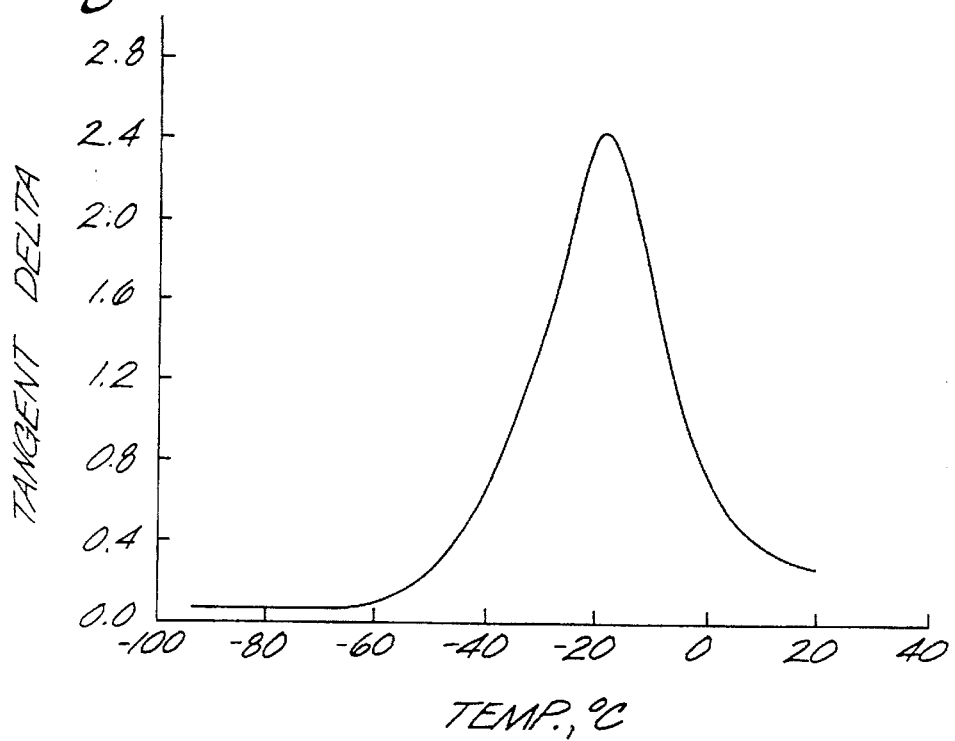
FIG. 7 in contrast, is a plot of tangent delta as a function of temperature (DMS) for a pressure-sensitive adhesive but where the elastomers present, shown in Control 1, are polyisoprene-based and which shows only one peak.
Figure 8:
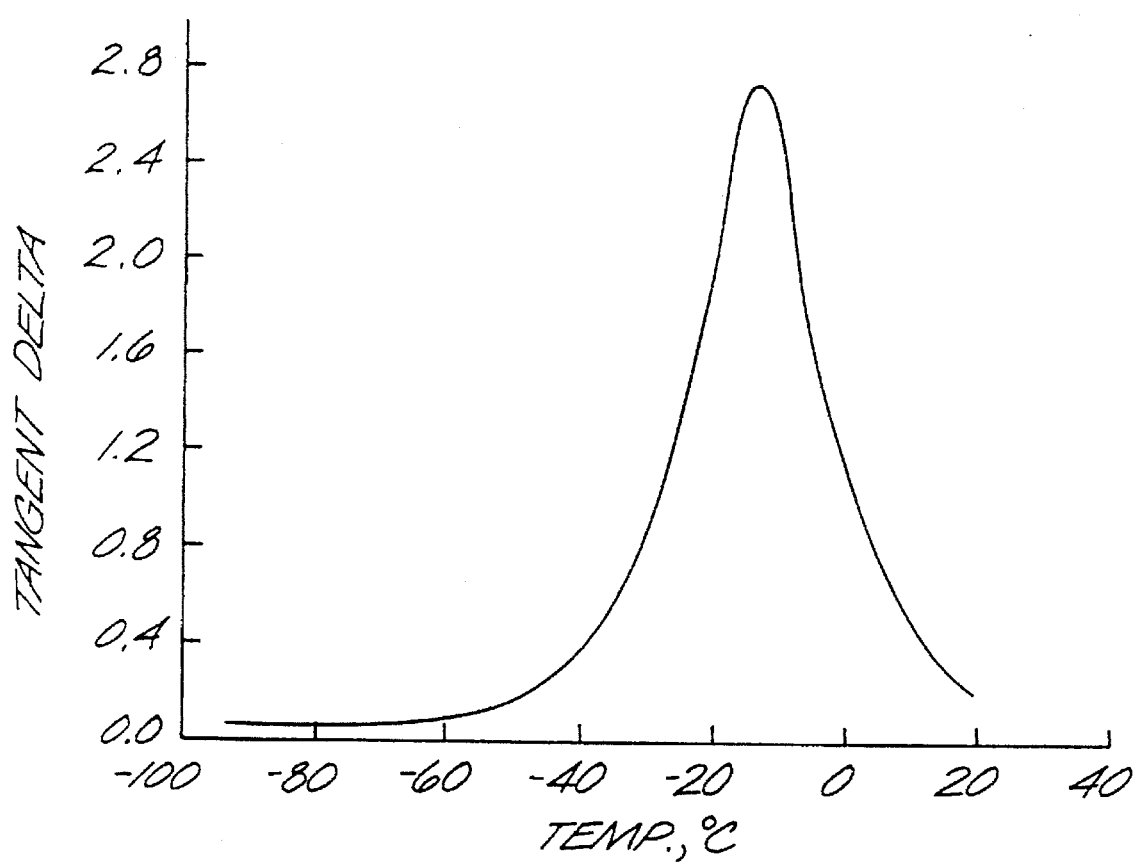
FIG. 8 is a DMS plot for the same composition, properties of which are shown in Control 2, but wherein the elastomeric constituent is solely polyisoprene-based, namely Kraton 1107.

Also not within the scope of the instant invention are systems based on a single polydiene (polyisoprene block copolymers) which also form a single peak (FIGS. 7 and 8).

As used herein, "tackifier system" consists of tackifiers which are preferentially miscible with the polydiene having the highest glass transition temperature (polyisoprene) and serves by preferential tackification to increase differential between the peaks and amplify the peak of the highest glass transition temperature. The tackifier system may also include normally liquid and solid tackifiers which leave unchanged or increase the glass transition temperature of the polyisoprene block and plasticizer oils which lower the glass transition temperature of the polyisoprene segment. Tackifier systems used in the practice of the instant invention, while including conventional tackifiers and plasticizer oils, must have the net effect of being preferentially soluble in the polyisoprene block so as to preferentially increase the difference between the glass transition temperature of the polyisoprene block component relative to the polybutadiene block component, with an increase (amplification) of the tangent delta of the polyisoprene peaks of the pressure-sensitive adhesive composition.

The polymers used in formulating the pressure-sensitive adhesives of this invention are based on natural and/or synthetic elastomeric polymers. Useful are AB, ABA and $(AB)_x$ block copolymers wherein x has a value of 3 or more and wherein A is a block comprising at least one monoalkenyl arene, preferably styrene, alpha methyl styrene, vinyl toluene and the like, and B is an elastomeric conjugated diene block, preferably a polybutadiene or a polyisoprene block. Preferably at least one is based on polybutadiene blocks and one other is based on polyisoprene blocks. These include, but are not limited to, homopolymers, block, random or multiarmed copolymers, and mixtures thereof. Among the useful elastomeric polymers there may be mentioned natural rubber (polyisoprene), polybutadiene, synthetic polyisoprene, random styrene-butadiene polymers, styrene-butadiene (SB) block copolymers, multiarmed and repeating (SB) copolymers, styrene-butadiene-styrene (SBS) block copolymers, styrene-isoprene (SI) block copolymers, styrene-isoprene-styrene (SIS) block copolymers, multiarmed styrene-isoprene $(SI)_x$ block copolymers, and the like. It will be understood that random copolymers may also be used and can reverse the diene preferentially tackified so long as the glass transition temperature of the polymer exhibiting the highest glass transition temperature is increased relative to the polymer of lower glass transition temperature.

Commercial elastomeric polymers used include linear SIS/SI block copolymers known as Kraton D-1107 and D-1112, SBS/SB block copolymers known as Kraton D-1101, D-1102 and DX-1300, and an $(SI)_x$ block copolymer known as Kraton D-1320X, all manufactured and sold by Shell Chemical Company, and an SB block copolymer known as Solprene 1205 manufactured and sold by Housemex, Inc. As indicated, in many of the SIS or SBS block copolymers, there are respectively present SI or SB components.

Other elastomers, such as the ethylene-propylene diene rubbers, styrene-ethylene/butylene, styrene block copolymers, styrene-ethylene/propylene-styrene block copolymers and the like, may also be used.

The weight ratio of the polybutadiene containing constituents of the mixture to the polyisoprene constituents of the mixture are such that there are provided two peaks on the DMS curve for the mixture as illustrated in FIG. 4. Generally, weight ratios range from about 0.5:1 upward. Compositions contemplated to be used in accordance with the instant invention are combined in ratios of about 0.5:1 to about 5:1, preferably from about 1:1 to about 1.5:1, and most preferably from about 1.3:1.

The pressure-sensitive adhesives of the instant invention are preferably combined with a tackifier system which is preferentially soluble in the polymerized isoprene component of the mixture of immiscible elastomers. The tackifier system is preferably made up of a normally solid tackifying resin which is solid at room temperature and obtained by polymerizing a stream of aliphatic hydrocarbons in the form of dienes and mono-olefins containing 5 or 6 carbon atoms, normally solid hydrogenated aromatic resins wherein a substantial portion, if not all, of the benzene rings are converted to cyclohexane rings and normally solid, saturated cyclic aliphatic hydrocarbons as well as mixtures thereof. They may be used alone or supplemented with other additives, such as, tackifiers which are normally liquid at room temperature, such as, resins obtained also by the polymerization of a stream of aliphatic petroleum derivatives in the form of dienes and mono-olefins containing 5 or 6 carbon atoms and which have a softening point of about 10° C., plasticizing oils and mixtures thereof.

Tackifier additives for the polyisoprene component are preferably obtained by the polymerization of a stream of aliphatic petroleum derivatives in the form of dienes and mono-olefins containing 5 or 6 carbon atoms generally in accordance with the teachings of U.S. Pat. Nos. 3,577,398 to Pace and 3,692,756 to St. Cyr, both incorporated herein by reference. The resultant hydrocarbons range from materials which are normally liquid at room temperature to those which are normally solid at room temperature and typically contain 40% or more by weight polymerized dienes. The dienes are typically piperylene and/or isoprene. They are sold by the Chemical Division of Goodyear Tire and Rubber Company as the Wingtack family of resins with the numerical designation being the softening point, e.g., Wingtack 95 which is normally a solid resin having a softening point of about 95° C. and Wingtack 10 which is normally a liquid resin having a softening point of about 10° C.

Other normally solid tackifiers are Escorez 1310 LC manufactured by Exxon and Piccotac 95 manufactured by Hercules.

Other additives which serve a tackifier function include hydrogenated aromatic resins wherein a very substantial portion, if not all, of the benzene rings are converted to cyclohexane rings (for example, the Regalrez family of resins manufactured by Hercules such as Regalrez 1018, 1033, 1065, 1078 and 1126, and Regalite R-100, and the Arkon family of resins from Arakwa Chemical such as Arkon P-85, P-100, P-115 and P-125), hydrogenated polycyclic resins (typically dicyclopentadiene resins such as Escorez 5300, 5320, 5340 and 5380 manufactured by Exxon) and the like.

There can be also added rosins, rosin esters, polyterpenes and other tackifiers which are compatible to some degree with the polyisoprene and polybutadiene phases. Other additives include plasticizer oils such as Shellflex 371 manufactured by Shell and Kaydol mineral oil manufactured by Witco which are soluble in both the polyisoprene and polybutadiene phases.

The tackifier system may be present in an amount, based on the total weight of tackifier system and elastomers, of from about 50% to about 80% by weight, preferably from about 50% to about 70% by weight, more preferably from about 60% to about 70% by weight. Conversely, the mixture of first and second elastomers are present in amount from about 20% to about 50% preferably from about 30% to about 50% and more preferably to about 30% to about 40% by weight based on the weight of the tackifier system and the elastomers. The presently preferred ratio is about 38% by weight elastomer and about 62% by weight tackifying resin additive, the resin additive preferably being a mixture of a normally solid tackifier such as Wingtack 95 or Escorez 1310 LC and a normally liquid tackifier such as Wingtack 10 or a plasticizer oil such as Shellflex 371. Polystyrene reinforcing additives may be present but are not required.

While, as will be seen, the pressure-sensitive adhesive formulations of the instant invention exhibit excellent low temperature and ambient temperature performance as well as convertibility, it may be desirable to enhance elevated temperature performance. This may be accomplished by cross-linking techniques such as the use of electron beam (EB) radiation and ultraviolet (UV) radiation and chemical cross-linking. If employed, it is desirable that tackifying additives be substantially saturated such that all of the energy of cure goes into cross-linking of the elastomeric components of the adhesive.

In considering the relative proportions of polybutadiene containing constituents to polyisoprene containing constituents, there is shown in Table 1 the relative tangent delta contributions of the polybutadiene (PB) and polyisoprene (PI) constituents. With reference thereto, at a ratio of 0.4:1 only one glass transition temperature peak is exhibited and the tangent delta is high, indicating a high amount of energy loss in cutting any pressure-sensitive adhesive formulated from the mixture. At higher proportions of polybutadiene to polyisoprene, there are exhibited two glass transition temperature peaks and the tangent delta values are lower showing lower overall energy being required for cutting of a formulated pressure-sensitive adhesive. Data in Table 1 are based on mixtures of Solprene 1205, a block copolymer of styrene and butadiene, and Kraton 1107, a mixture, as manufactured, of SIS triblocks and SI diblocks.

TABLE 1

| PB/PI | PB Tg (°C.) | Tan Delta Max | PI Tg (°C.) | Tan Delta Max |
|---|---|---|---|---|
| 0.4/1.0 | — | — | −57 | 1.64 |
| 1.0/1.0 | −80 | 0.45 | −54 | 0.71 |
| 1.3/1.0 | −77 | 0.64 | −54 | 0.56 |
| 1.5/1.0 | −81 | 0.70 | −55 | 0.50 |
| 2.5/1.0 | −77 | 0.76 | −54 | 0.41 |
| 5.0/1.0 | −82 | 0.84 | −54 | 0.33 |

EXAMPLES 1 TO 10

Based on the initial findings, an experimental design was established to determine the effect of adhesive performance at various concentrations of elastomer using a normally solid tackifier (Escorez 1310 LC) and a normally liquid tackifier (Wingtack 10). The results are tabulated in Table 2 wherein RT means room temperature, PE means polyethylene, CB means cardboard, LT means looptack which is determined by an Instron machine in which a loop is placed in jaws of the Instron machine with adhesive exposed and allowed to descend at a predetermined rate to the surface of the substrate to cover an area approximately 1" by 1" and immediately thereafter removed, with a peak of force determined being reported as looptack. Ninety degree peel is measured by pressure sensitive Tape Council Test Method No. 2. Viscosity is measured by Brookfield viscometer with a thermo-cell attachment and measured with a No. 2 spindle at 10 rpm after the adhesive sample has been at 175° C. for one hour. Each of the compositions or hot-melt components were compounded using a one liter sigma blade mixer, coated using a hot-melt coater onto a release liner and laminated to a 50 pounds per ream paper face stock.

Figure 9:
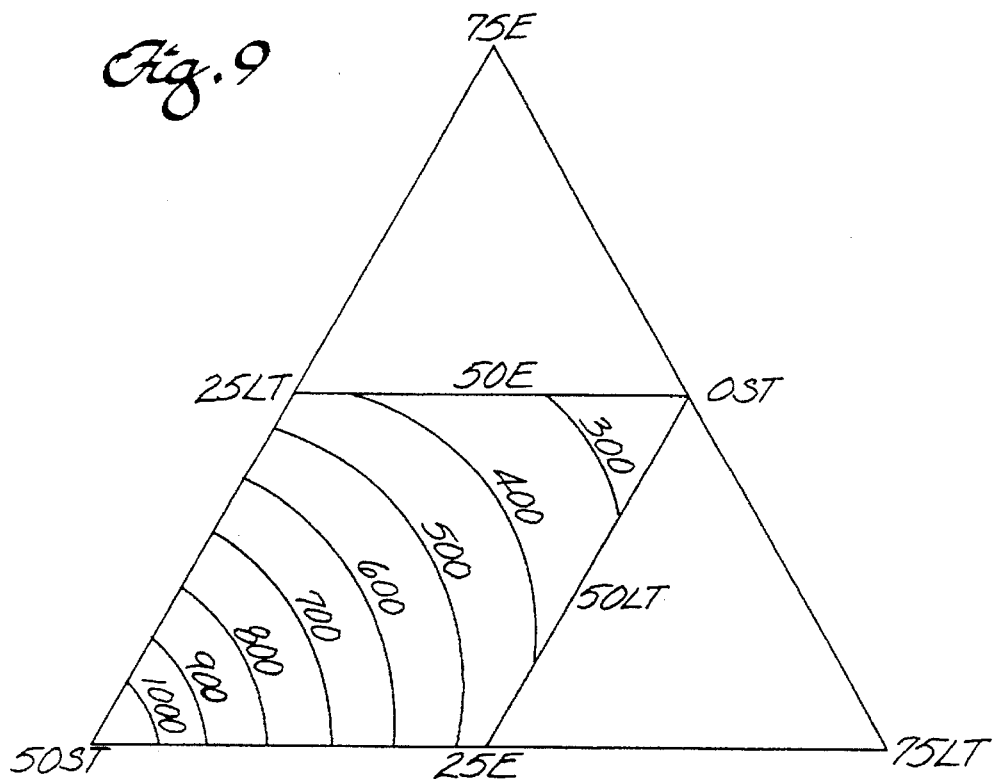
FIGS. 9, 10 and 11 are ternary diagrams based on data collected which predict, based upon regression analysis of data reported in Table 2, looptack to polyethylene at temperatures of 23° C.
Figure 10:
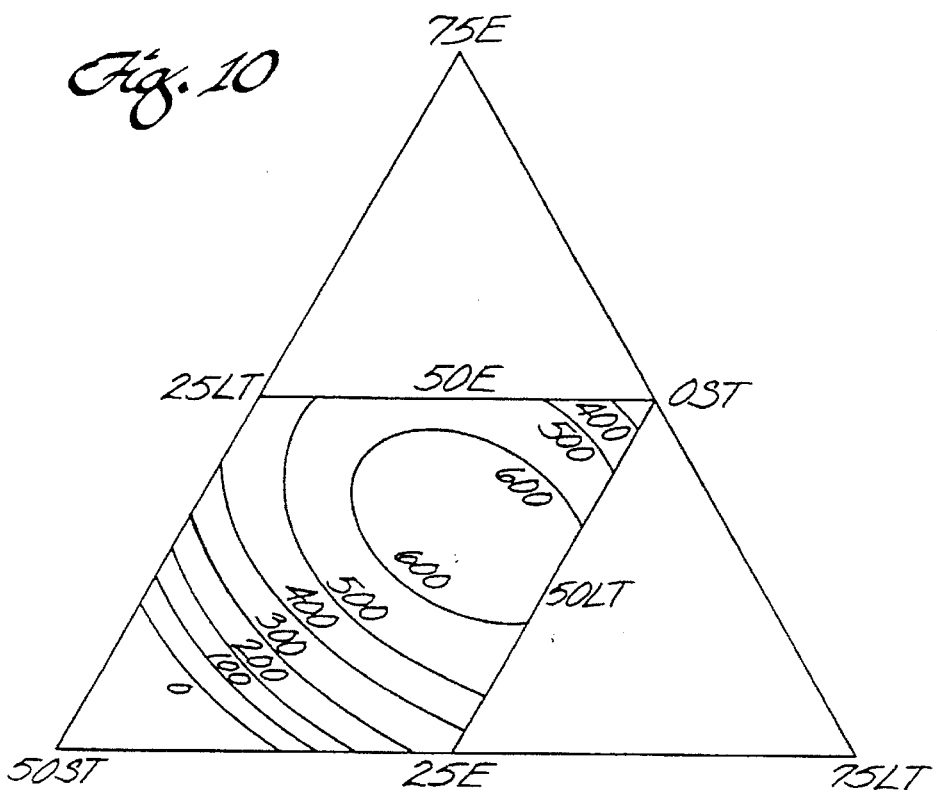
Figure 11:
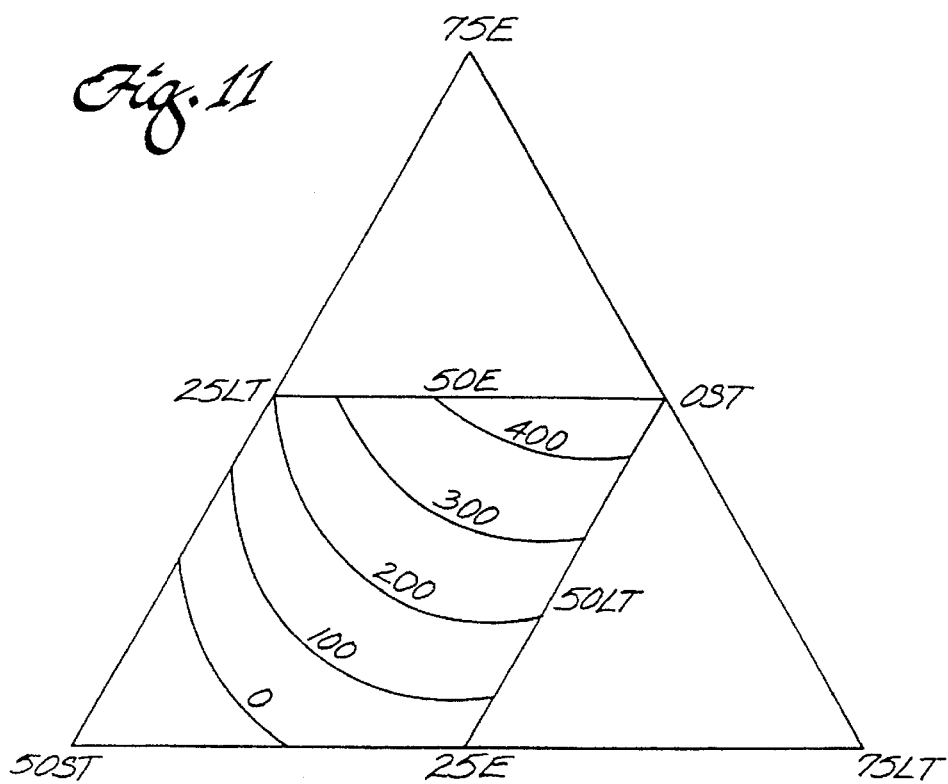
Figure 12:
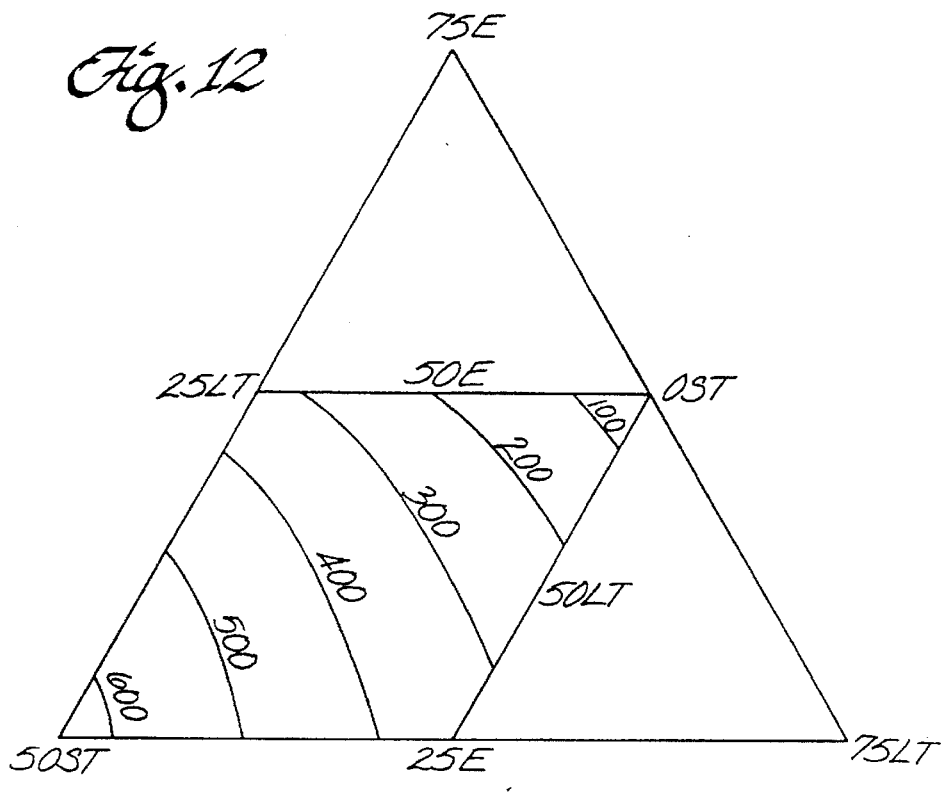
FIG. 12 is a plot of predicted constant values of looptack to cardboard at 23° C. as a function of composition.
Figure 13:
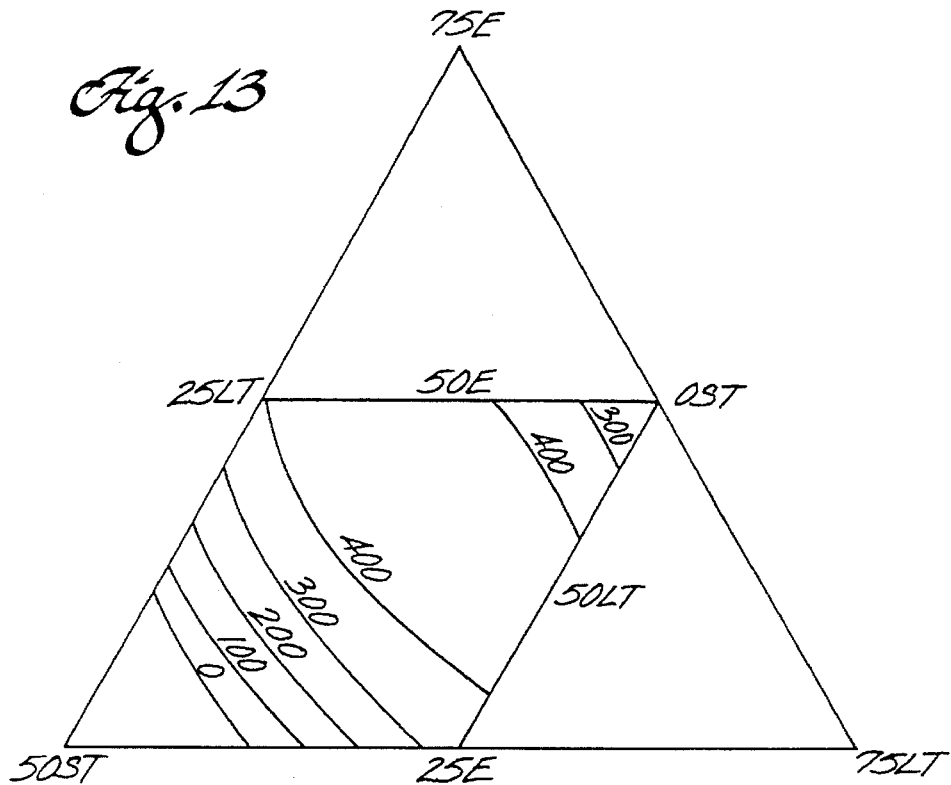
FIG. 13 is a plot of predicted constant values of looptack to cardboard at 5° C. as a function of composition.
Figure 14:
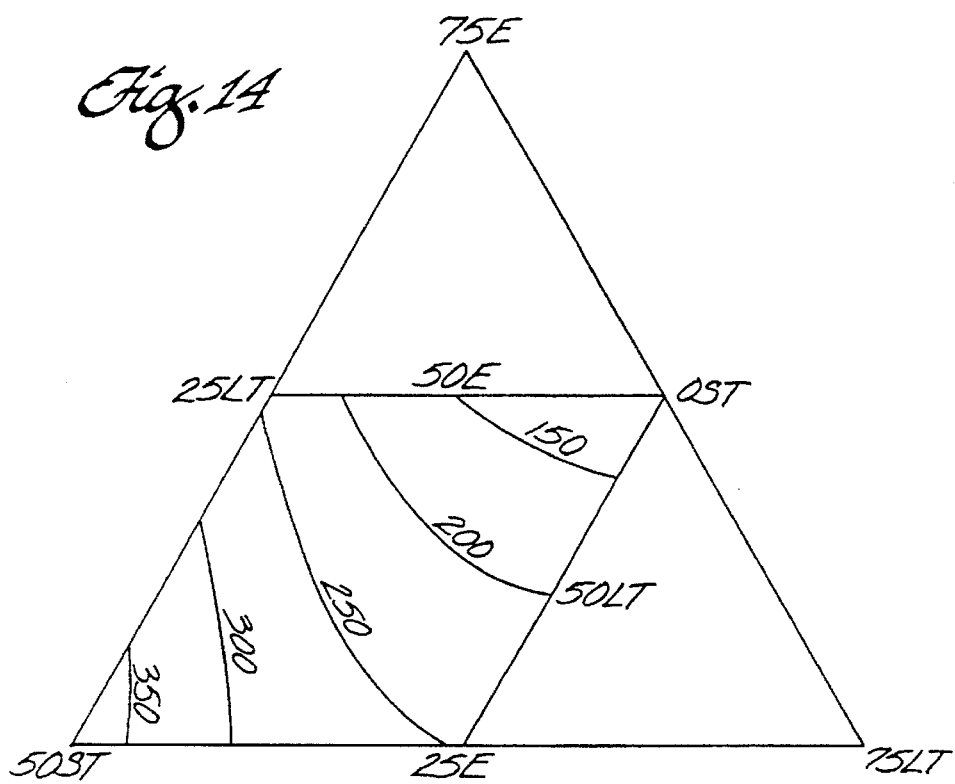
FIG. 14 is a plot of predicted constant values of 90° peel to cardboard, also as a function of composition.

The data given in Table 2 establish as shown in FIGS. 8–10 the predicted compositions of constant looptack to polyethylene at temperatures of 23° C., 5° C. and −5° C., while FIGS. 11 and 12 show predicted values of constant looptack for cardboard at 23° C. and 5° C., and FIG. 13 shows predicted values of constant looptack 90° peel to cardboard. FIGS. 9 and 10, in comparison, show a reversal of looptack as the temperature decreases from 23° C. to −5° C., while at 5° C. show a fairly symmetrical pattern.

EXAMPLES 11 TO 16

Based on the experimental design, using an elastomeric mixture at a weight ratio of approximately 1.3:1 SB to SIS, there were formed several adhesive formulations, the composition and viscosity of which are shown in Table 3.

TABLE 3

|  | Ex 11 | Ex 12 | Ex 13 | Ex 14 | Ex 15 | Ex 16 |
|---|---|---|---|---|---|---|
| Solprene 1205 | 23.4 | 18.9 | 20.0 | 21.2 | 22.3 | 22.3 |
| Kraton 1107 | 18.6 | 15.1 | 16.0 | 16.8 | 27.7 | 17.7 |
| Escoret 1310 LC | 14.6 | 32.0 | 24.0 | 24.0 | 24.0 | 20.0 |
| Wingtack 10 | 42.0 | 34.0 | 40.0 | 38.0 | 36.0 | 40.0 |
| Ethyl 330 | 0.7 | 0.7 | 0.7 | 0.7 | 0.7 | 0.7 |
| Cyanox LTDP | 0.7 | 0.7 | 0.7 | 0.7 | 0.7 | 0.7 |
| Visc. @ 175° C., Pa · s | 28.3 | 6.5 | 9.6 | 15.4 | 22.0 | 19.6 |
| Visc. @ 175° C., Pa · s | 24.2 | 10.1 | 10.8 | 14.6 | 20.8 | 17.9 |

CONTROL 1 AND EXAMPLE 17

Table 4 shows two formulations and compares the performance of an adhesive formulation based solely on SIS (Control 1) and a blend of SB and SIS (Example 17). As can be seen, looptack performance is substantially improved for the mixture of elastomers as compared to compositions based on SIS alone and the same tackifying additives. The DMS plot for Example 17 is shown in FIG. 6 in comparison to the same formulation except that the elastomer used was solely Kraton 1112 (FIG. 7)

TABLE 4

| Formulation | Control 1 | Example 17 |
|---|---|---|
| Solprene 1205 | 0.0 | 21.2 |
| Kraton 1112 | 38.0 | 16.8 |
| Excorez 1310 LC | 38.0 | 38.0 |

TABLE 2

| EX | RUBBER MIX | ESCOREZ 1310 | WINGTACK 10 | RT LT on Glass N/m | RT LT on PE N/m | RT LT on CB N/m | +5° C. LT on PE N/m | +5° C. LT on CB N/m | −5° C. LT on PE N/m | 90° C. PEEL on PE RT N/m | 90° C. PEEL on CB RT N/m | VISC. @ 175° C. Pa · s |
|---|---|---|---|---|---|---|---|---|---|---|---|---|
| 1 | 25.0 | 25.0 | 50.0 | 706.0 | 475.1 | 325.5 | 341.6 | 365.0 | 23.4 | 312.3 | 254.6 | 2.0 |
| 2 | 25.0 | 37.5 | 37.5 | 971.1 | 775.6 | 502.6 | 17.5 | 25.7 | 11.7 | 477.7 | 262.5 | 2.75 |
| 3 | 37.5 | 37.5 | 25.0 | 1047.2 | 833.3 | 565.6 | 67.2 | 73.0 | 26.3 | 494.8 | 325.5 | 15.4 |
| 4 | 50.0 | 25.0 | 25.0 | 607.6 | 431.8 | 311.0 | 525.6 | 417.6 | 160.6 | 301.8 | 244.1 | 92.2 |
| 5 | 50.0 | 12.5 | 37.5 | 616.8 | 337.3 | 207.4 | 449.7 | 224.8 | 458.4 | 322.8 | 144.4 | 60.5 |
| 6 | 50.0 | 0.0 | 50.0 | 297.9 | 252.0 | 61.7 | 391.3 | 195.6 | 417.6 | 283.5 | 95.8 | 38.4 |
| 7 | 37.5 | 12.5 | 50.0 | 581.4 | 367.5 | 248.0 | 607.4 | 394.2 | 543.1 | 379.3 | 192.9 | 11.0 |
| 8 | 37.5 | 25.0 | 37.5 | 699.5 | 486.9 | 353.0 | 770.9 | 417.6 | 143.1 | 363.5 | 219.2 | 14.4 |
| 9 | 37.5 | 25.0 | 37.5 | 845.1 | 476.4 | 337.3 | 659.9 | 496.4 | 116.8 | 414.7 | 283.5 | 14.2 |
| 10 | 42.6 | 14.8 | 42.6 | 629.9 | 341.2 | 223.1 | 586.9 | 344.6 | 458.4 | 370.1 | 189.0 | 23.2 |

TABLE 4-continued

| Formulation | Control 1 | Example 17 |
| --- | --- | --- |
| Shellflex 371 | 24.0 | 24.0 |
| Ethyl 330 | 0.7 | 0.7 |
| Cyanox LTDP | 0.7 | 0.7 |
| RT LT Glass, N/m | 437 | 688 |
| RT LT PE, N/m | 369 | 438 |
| RT LT CB, N/m | 293 | 325 |
| (+5° C.) LT PE, N/m | 500 | 756 |
| (+5° C.) LT CB, N/m | 388 | 569 |
| (−5° C.) LT PE, N/m | 508 | 534 |

CONTROL 2 AND EXAMPLE 18

Table 5, by comparison, shows the looptack properties of the optimum composition of this invention (Example 18, FIG. 5) to the same composition where the elastomer is solely Kraton 1107 (Control 2 and FIG. 8). The composition of Example 18 had, as compared to Control 2, better overall properties.

The composition of Example 18 was coated on a release liner and then laminated to a paper face stock and the laminate converted. It was observed that cutting was improved considerably without evidence of stringiness of adhesive during matrix stripping operations.

TABLE 5

| Formulation | Control 2 | Example 18 |
| --- | --- | --- |
| Solprene 1205 | 0.0 | 21.2 |
| Kraton 1107 | 38.0 | 16.8 |
| Escorez 1310 LC | 24.0 | 24.0 |
| Wingtack 10 | 38.0 | 38.0 |
| Ethyl 330 | 0.7 | 0.7 |
| Cyanox LTDP | 0.7 | 0.7 |
| RT LT Glass, N/m | 427 | 958 |
| RT LT PE, N/m | 335 | 495 |
| RT LT CB, N/m | 156 | 384 |
| (+5° C.) LT PE, N/m | 599 | 876 |
| (+5° C.) LT CB, N/m | 430 | 531 |
| (−5° C.) LT PE, N/m | 781 | 301 |

What is claimed is:

1. A pressure-sensitive adhesive comprising:
   a) a mixture of elastomers comprised of:
      i) a first elastomer providing a first polymerized diene component, said first elastomer exhibiting a first glass transition temperature;
      ii) a second elastomer providing a second polymerized diene component, said second elastomer exhibiting a second glass transition temperature which is greater than the first glass transition temperature, said second polymerized diene component being immiscible in the first polymerized diene component, said first and second elastomers combined in a mixture wherein the dynamic mechanical spectrum of the mixture exhibits a first glass transition temperature and a first value of tangent delta which is attributed to the first polymerized diene component and a second glass transition temperature and a second value of tangent delta which is attributed to the second polymerized diene component, said second glass transition temperature being higher than the first glass transition temperature, said mixture of immiscible elastomers being combined with:
   (b) a tackifying system comprising at least one tackifier which is preferentially soluble in the second elastomer, said tackifying system being present in an amount of 50% to about 80% by weight based on the total weight of the mixture of said immiscible elastomers and said tackifying system, and sufficient to cause the dynamic mechanical spectrum of the mixture of immiscible elastomers to exhibit an increase in the second glass transition temperature and an increase in the difference between the first and second glass transition temperatures and an increase in the value of tangent delta determined at the second glass transition temperature.

2. A pressure-sensitive adhesive as claimed in claim 1 in which the first polymerized diene component is a polymerized butadiene component and the second polymerized diene component is a polymerized isoprene component.

3. A pressure sensitive adhesive as claimed in claim 2 in which the first elastomer is selected from the group consisting of polybutadiene, styrene-butadiene block copolymers, styrene-butadiene styrene block copolymers, styrene-butadiene multiarmed block copolymers and mixtures thereof.

4. A pressure sensitive adhesive as claimed in claim 2 in which the second elastomer is selected from the group consisting of natural rubber, synthetic polyisoprene, styrene-isoprene-styrene block copolymers, styrene-isoprene block copolymers, styrene-isoprene multiarmed block copolymers and mixtures thereof.

5. A pressure sensitive adhesive as claimed in claim 3 in which the second elastomer is selected from the group consisting of natural rubber, synthetic polyisoprene, styrene-isoprene-styrene block copolymers, styrene-isoprene block copolymers, styrene-isoprene multiarmed block copolymers and mixtures thereof.

6. A pressure-sensitive adhesive as claimed in claim 2 in which the tackifying system which is preferentially soluble in the polymerized isoprene and comprises a compound selected from the group consisting of normally solid tackifying resins, obtained by the polymerization of aliphatic petroleum derivatives in the form of dienes and mono-olefins containing 5 or 6 carbon atoms, normally solid hydrogenated aromatic hydrocarbons, normally solid saturated cycloaliphatic hydrocarbons and mixtures thereof.

7. A pressure-sensitive adhesive as claimed in claim 6 in which the tackifying system further comprises a compound selected from the group consisting of a tackifying resins obtained by the polymerization of a stream of aliphatic petroleum derivatives in the form of dienes and mono-olefins containing 5 or 6 carbon atoms, and having a softening point of about 10° C., a plasticizing oil and mixtures thereof.

8. A pressure-sensitive adhesive as claimed in claim 5 in which the tackifying system which is preferentially soluble in the second elastomer and comprises a component selected from the group consisting of normally solid tackifying resins, obtained by the polymerization of a stream of aliphatic petroleum derivatives in the form of dienes and mono-olefins containing 5 or 6 carbon atoms, normally solid hydrogenated aromatic hydrocarbons, normally solid saturated cycloaliphatic hydrocarbons and mixtures thereof.

9. A pressure-sensitive adhesive as claimed in claim 8 in which the tackifying system further comprises a compound selected from the group consisting of a liquid tackifying resins obtained by the polymerization of a stream of aliphatic petroleum derivatives in the form of dienes and mono-olefins containing 5 or 6 carbon atoms, and having a softening point of about 10° C., a plasticizing oil and mixtures thereof.

10. A pressure-sensitive adhesive as claimed in claim 1 in which the weight ratio of the first elastomer to the second elastomer is about 0.5:1 to about 5:1.

11. A pressure-sensitive adhesive as claimed in claim 2 in which the weight ratio of the first elastomer to the second elastomer is about 0.5:1 to about 1:1.

12. A pressure sensitive adhesive as claimed in claim 3 in which the weight ratio of the first elastomer to the second elastomer is about 0.5:1 to about 5:1.

13. A pressure-sensitive adhesive as claimed in claim 5 in which the weight ratio of the first elastomer to the second elastomer is about 0.5:1 to about 5:1.

14. A pressure-sensitive adhesive as claimed in claim 1 in which the weight ratio of the first elastomer to the second elastomer is at about 1.0:1 to about 1.5:1.

15. A pressure-sensitive adhesive as claimed in claim 2 in which the weight ratio of the first elastomer to the second elastomer is about 1.0:1 to about 1.5:1.

16. A pressure-sensitive adhesive as claimed in claim 3 in which the weight ratio of the first elastomer to the second elastomer is about 1.0:1 to about 1.5:1.

17. A pressure-sensitive adhesive as claimed in claim 5 in which the weight ratio of the first elastomer to the second elastomer is about 1.0 to about 1.5.

18. A pressure-sensitive adhesive as claimed in claim 1 in which the first and second elastomers are present in an amount of from about 30% to 50% by weight based on the total weight of the mixture of immiscible elastomers and tackifying system.

19. A pressure-sensitive adhesive as claimed in claim 5 in which the first and second elastomers are present in an amount of from about 30% to 50% by weight based on the total weight of the mixture of immiscible elastomers and tackifying system.

20. A pressure-sensitive adhesive comprising:
a) a first elastomer selected from the group consisting of polybutadiene, styrene-butadiene-styrene block copolymers, styrene-butadiene block copolymers and mixtures thereof, said first elastomer exhibiting a first glass transition temperature and a first value of tangent delta measured as a function of temperature;
b) a second elastomer selected from the group consisting of natural rubber, polyisoprene, styrene-isoprene-styrene block copolymers, styrene-isoprene block copolymers, multiarmed styrene-isoprene block copolymers and mixtures thereof, said second elastomer exhibiting a second glass transition temperature greater than the glass transition temperature of the first elastomer and a second value of tangent delta measured as a function of temperature, the second elastomer being immiscible in the first elastomer, said first and second elastomers provided in a weight ratio of first elastomer to second elastomer of above 0.4:1 to about 5:1 and wherein the dynamic mechanical spectrum of the mixture exhibits a first glass transition temperature peak attributable to the first elastomer which is separate from and lower than a second glass transition temperature peak attributable to the second elastomer; and
c) a tackifying system comprising at least one tackifier component which is preferentially soluble in the polymerized isoprene portion of the second elastomer, said tackifying system being present in and amount of 50% to about 80% by weight based on the total weight of said immiscible elastomers and said tackifying system, and sufficient to cause an increase in the temperature difference between the first elastomer attributable glass transition temperature peak and the second elastomer attributable glass transition temperature peak and an increase in the tangent delta value at the second elastomer glass transition temperature peak.

21. A pressure-sensitive adhesive as claimed in claim 20 in which the first elastomer is a styrene-butadiene block copolymer and the second elastomer is selected from the group consisting of a styrene-isoprene-styrene block copolymers, multiarmed styrene-isoprene block copolymers, styrene-isoprene block copolymers and mixtures thereof.

22. A pressure sensitive-adhesive as claimed in claim 20 in which the tackifying system is preferentially soluble in the polyisoprene elastomer and comprises a compound selected from the group consisting of normally solid tackifying resins obtained by the polymerization of a stream of aliphatic petroleum derivatives in the form of dienes and mono-olefins containing 5 or 6 carbon atoms, normally solid hydrogenated aromatic hydrocarbons, normally solid saturated cycloaliphatic hydrocarbons and mixtures thereof.

23. A pressure-sensitive adhesive as claimed in claim 22 in which the tackifying system further comprises a compound selected from the group consisting of a liquid tackifying resins obtained by the polymerization of a stream of aliphatic petroleum derivatives in the form of dienes and mono-olefins containing 5 or 6 atoms, a plasticizer oil and mixtures thereof.

24. A pressure-sensitive adhesive as claimed in claim 21 in which the tackifying system is preferentially soluble in the polyisoprene elastomer and comprises a compound selected from the group consisting of normally solid tackifying resins obtained by the polymerization of a stream of aliphatic petroleum derivatives in the form of dienes and mono-olefins containing 5 or 6 carbon atoms, normally solid hydrogenated aromatic hydrocarbons, normally solid saturated cycloaliphatic hydrocarbons and mixtures thereof.

25. A pressure-sensitive adhesive as claimed in claim 22 in which the tackifying system further comprises a compound selected from the group consisting of a normally tackifying resins by the polymerization of a stream of aliphatic petroleum derivatives in the form of dienes and mono-olefins containing 5 or 6 atoms, a plasticizer oil and mixtures thereof.

26. A pressure-sensitive adhesive as claimed in claim 20 in which the weight ratio of the first elastomer to the second elastomer is about 1.0:1 to about 1.5:1.

27. A pressure-sensitive adhesive as claimed in claim 21 in which the weight ratio of the first elastomer to the second elastomer is about 1.0:1 to about 1.5:1.

28. A pressure-sensitive adhesive as claimed in claim 22 in which the weight ratio of the first elastomer to the second elastomer is about 1.0:1 to about 1.5:1.

29. A pressure-sensitive adhesive as claimed in claim 23 in which the weight ratio of the first elastomer to the second elastomer is about 1.0:1 to about 1.5:1.

30. A pressure-sensitive adhesive as claimed in claim 20 in which a mixture of immiscible first and second elastomers are present in an amount of from about 30% to 50% by weight based on the total weight of the mixture and tackifying system.

31. A pressure-sensitive adhesive as claimed in claim 21 in which a mixture of immiscible first and second elastomers are present in an amount of from about 30% to 50% by weight based on the total weight of the mixture and tackifying system.

32. A pressure-sensitive adhesive as claimed in claim 23 in which a mixture of immiscible first and second elastomers are present in an amount of from about 30% to 50% by weight based on the total weight of the mixture and tackifying system.

33. A pressure-sensitive adhesive as claimed in claim 25 in which a mixture of immiscible first and second elastomers are present in an amount of from about 30% to 50% by weight based on the total weight of the mixture and tackifying system.

34. A pressure-sensitive adhesive comprising:
   a) a mixture of immiscible elastomers comprising a first elastomer which is selected from the group consisting of styrene-butadiene, styrene-butadiene-styrene block copolymers and mixtures thereof which first elastomer exhibits a first glass transition temperature peak attributable to polymerized butadiene and a second elastomer selected from the group consisting of multiarmed styrene-isoprene block copolymers, styrene-isoprene block copolymers, styrene-isoprene-styrene block copolymers and mixtures thereof, which second elastomer exhibits a second glass transition peak temperature which is attributable to polymerized isoprene, and is greater than the first glass transition temperature peak, said first and second elastomers provided in a weight ratio of from above 0.4:1 to about 5:1, said first and second glass transition temperature peaks being exhibited on a dynamic mechanical spectrum plot of tangent delta as a function of temperature; and
   b) a tackifying system present in an amount of from 50% to about 80% by weight based on the total weight of the said elastomers and said tackifying system, said tackifying system containing at least one tackifier which is preferentially soluble in the polymerized isoprene component of the second elastomer and comprising normally solid resin tackifiers obtained by polymerization of a stream of aliphatic petroleum derivatives in the form of dienes and mono-olefins containing 5 or 6 carbon atoms and having a softening point of 95° C. said tackifying system causing an increase in the second glass transition peak to maintain a second glass transition temperature greater than the first glass transition temperature and an increase in tangent delta at the second glass transition temperature.

35. A pressure-sensitive adhesive as claimed in claim 34 in which the tackifying system further comprises a compound selected from the group consisting of a normally liquid tackifying resins obtained by the polymerization of a stream of aliphatic petroleum derivatives in the form of dienes and mono-olefins containing 5 or 6 carbon atoms, a plasticizer oil and mixtures thereof.

36. A pressure-sensitive adhesive as claimed in claim 34 in which the weight ratio of the first elastomer to the second elastomer is about 1:1 to about 1.5:1.

37. A pressure-sensitive adhesive as claimed in claim 35 in which the weight ratio of the first elastomer to the second elastomer is about 1:1 to about 1.5:1.

38. A pressure-sensitive adhesive as claimed in claim 34 in which the mixture of the first and second elastomers are in an amount of about 30% by weight based on the total weight of the mixture and tackifying system.

39. A pressure-sensitive adhesive as claimed in claim 35 in which the mixture of the first and second elastomers are present in an amount of about 30% by weight based on the total weight of the mixture and tackifying system.

40. A pressure-sensitive adhesive as claimed in claim 36 in which the mixture of the first and second elastomers are present in an amount of about 30% by weight based on the total weight of the mixture and tackifying system.

41. A pressure-sensitive adhesive as claimed in claim 1 further comprising a second tackifier selected from, the group consisting of rosins, rosin esters and polyterpenes and mixtures thereof.

42. A pressure-sensitive adhesive comprising:
   a) a first elastomer selected from the group consisting of polybutadiene, styrene-butadiene-styrene block copolymers, styrene-butadiene block copolymers and mixtures thereof, said first elastomer exhibiting a first glass transition temperature and a first value of tangent delta measured as a function of temperature which is attributable to polymerized butadiene;
   b) a second elastomer selected from the group consisting of natural rubber, polyisoprene, styrene-isoprene-styrene block copolymers, styrene-isoprene block copolymers, styrene-isoprene multiarmed block copolymers and mixtures thereof, said second elastomer exhibiting a second glass transition temperature greater than the first glass transition temperature and a second value of tangent delta measured as a function of temperature which is attributable to polymerized isoprene, the second elastomer being immiscible in the first elastomer, said first and second elastomers provided in proportions at which a dynamic mechanical spectrum plot of tangent delta as a function of temperature exhibits a polymerized butadiene-attributable first glass transition temperature peak determinable separate from and lower than a polymerized isoprene-attributable second glass transition temperature peak;
   c) a first tackifying system comprising at least one tackifying component which is preferentially miscible with the second elastomer and present in an amount sufficient to cause an increase in the second glass transition temperature and an increase in the temperature difference between the polymerized butadiene-attributable glass transition temperature peak and the polymerized isoprene-attributable glass transition temperature peak and an increase in the tangent delta value determined at the glass transition temperature peak attributable to polymerized isoprene; and
   d) a second tackifier selected from the group consisting of rosins, rosin esters, polyterpenes and mixtures thereof said tackifiers being present in an amount of from 50% to about 80% by weight based on the total weight of said elastomers and said tackifiers.

43. A pressure-sensitive adhesive comprising:
   a) a first elastomer selected from the group consisting of styrene-butadiene-styrene block copolymers, styrene-butadiene block copolymers and mixtures thereof, said first elastomer exhibiting a first glass transition temperature and a first value of tangent delta measured as a function of temperature;
   b) a second elastomer providing a polymerized isoprene portion and selected from the group consisting of styrene-isoprene-styrene block copolymers, styrene-isoprene block copolymers, multiarmed styrene-isoprene block copolymers and mixtures thereof, said second elastomer exhibiting a second glass transition temperature greater than the glass transition temperature of the first elastomer and a second value of tangent delta measured as a function of temperature, the second elastomer being immiscible in the first elastomer, the mixture providing a dynamic mechanical spectrum which exhibits a first glass transition temperature peak attributable to the first elastomer which is separate from and lower than a second glass transition temperature peak attributable to the second elastomer; and
   c) a tackifying system comprising at least one tackifier component which is preferentially soluble in the polymerized isoprene portion of the second elastomer said tackifying system being present in and amount of 50% to about 80% by weight based on the total weight of said immiscible elastomers and said tackifying system, and sufficient to cause an increase in the temperature difference between a glass transition temperature peak attributable to the first elastomer and a glass transition temperature peak attributable to the second elastomer and an increase in the tangent delta value at the second elastomer glass transition temperature peak.

44. A pressure-sensitive adhesive as claimed in claim 43 in which there is present a plasticizer oil.

45. A pressure-sensitive adhesive comprising a mixture of:
   a) mixture of elastomers comprised of:
      i. a first elastomer selected from the group consisting of styrene-butadiene-styrene block copolymers, styrene-butadiene block copolymers and mixtures thereof, said first elastomer exhibiting in the mixture a first glass transition temperature and a first value of tangent delta measured as a function of temperature;
      ii. a second elastomer selected from the group consisting of styrene-isoprene-styrene block copolymers, styrene-isoprene block copolymers, and mixtures thereof, said second elastomer exhibiting in the mixture a second glass transition temperature greater than the first glass transition temperature and a second value of tangent delta measured as a function of temperature, the second elastomer being immiscible in the first elastomer, said first and second elastomers provided in proportions to provide a dynamic mechanical spectrum plot of tangent delta as a function of temperature which exhibits a polybutadiene-attributable first glass transition temperature peak determinably separate from and lower than a polyisoprene-attributable second glass transition temperature peak, said mixture of immiscible elastomers being combined with;
      iii. a tackifying system comprising normally solid and normally liquid tackifying components in which at least one tackifying component is preferentially miscible with the second elastomer, said tackifying system being present in an amount of from 50% to about 80% by weight based on the mixture of said elastomer and said tackifying system and sufficient to cause an increase in the second glass transition temperature and an increase in the temperature difference between the polybutadiene-attributable glass transition temperature peak and the polyisoprene-attributable glass transition temperature peak and an increase in the tangent delta value determined at the polyisoprene glass transition temperature peak, said normally solid and normally liquid tackifying components being separately obtained by polymerization of a stream of aliphatic petroleum derivatives in the form of dienes and mono-olefins containing 5 or 6 carbon atoms; and
   b) a plasticizer oil.

* * * * *

UNITED STATES PATENT AND TRADEMARK OFFICE
CERTIFICATE OF CORRECTION

PATENT NO. : 5,663,228
DATED : September 2, 1997
INVENTOR(S) : Yukihiko Sasaki; Jesse Ercillo It is certified that error appears in the above-indentified patent and that said Letters Patent is hereby corrected as shown below:

Column 3, line 42, replace "containing5" with -- containing 5 --.
Column 4, lines 66,67, replace "temperatures" with -- temperature --.
Column 8, line 42, after "in" and before "amount" insert -- an --.
Column 10, line 22, replace "Escoret" with -- Escorez --.
Column 12, line 42, after "of" and before "tackifying" delete "a".
Column 12, line 59, after "of" and before "liquid" delete "a".
Column 13, line 59, replace "and amount" with -- an amount --.
Column 14, line 4, after "of" and before "styrene-isoprene-styrene" delete "a".
Column 14, line 18, after "of" and before "liquid" delete "a".
Column 14, line 34, after "of" delete "a normally".
Column 15, line 40, after "of" delete "a normally".
Column 15, lines 52,53, after "are" and before "in" insert -- present --.
Column 15, line 59, replace "claim 36" with -- claim 37 --.
Column 15, line 64, replace "from," with -- from --.
Column 16, line 67, replace "and amount" with -- an amount --.

Signed and Sealed this

Thirtieth Day of May, 2000

Attest:

Q. TODD DICKINSON

*Attesting Officer*        *Director of Patents and Trademarks*

UNITED STATES PATENT AND TRADEMARK OFFICE
CERTIFICATE OF CORRECTION

PATENT NO.    : 5,663,228
DATED         : September 2, 1997
INVENTOR(S)   : Yukihiko Sasaki and Jesse Ercillo It is certified that error appears in the above-identified patent and that said Letters Patent is hereby corrected as shown below:

Title page,
Item [63], Related U.S. Application Data, replace "which is a continuation of Ser. No. 493,363, Mar. 14, 1990, abandoned." with -- which is a continuation of Ser. No. 493,365, Mar. 14, 1990, abandoned --.

Column 1,
Line 8, replace "Ser. No. 07/493,363" with -- Ser. No. 07/493,365 --.

Signed and Sealed this

Third Day of September, 2002

*Attest:*

JAMES E. ROGAN
*Attesting Officer*   *Director of the United States Patent and Trademark Office*